United States Patent Office 2,927,074
Patented Mar. 1, 1960

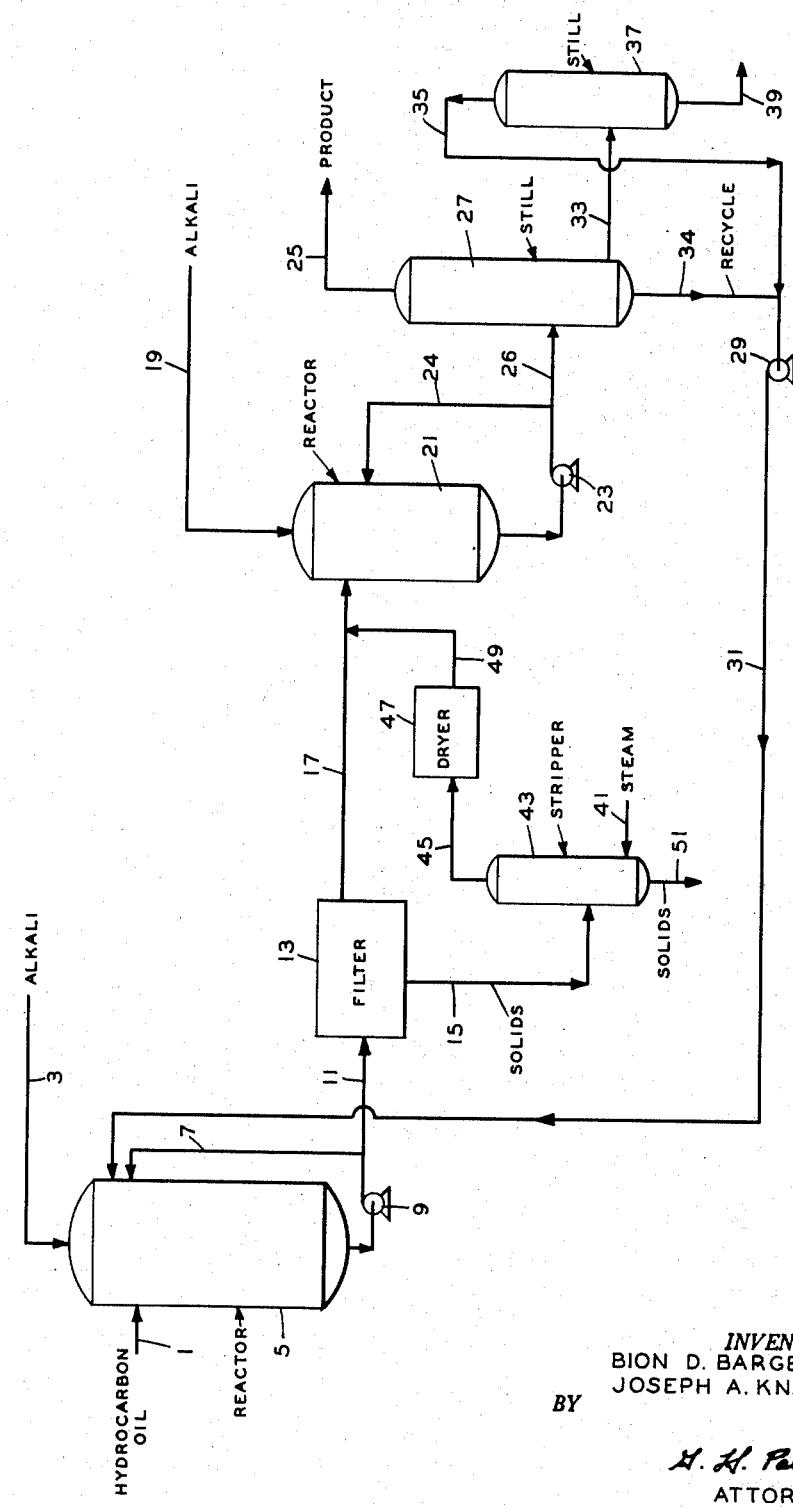

2,927,074

PURIFICATION OF HYDROCARBON OILS USING SODIUM

Bion D. Barger, Jr., Niagara Falls, N.Y., and Joseph A. Knaus, Packanack Lake, N.J., assignors to The M. W. Kellogg Company, Jersey City, N.J., a corporation of Delaware Application July 7, 1955, Serial No. 520,405

4 Claims. (Cl. 208—208)

This invention relates to an improved process for purifying hydrocarbon oils. More particularly it pertains to an improved method of removing from hydrocarbon oils, impurities which produce undesirable odors, gum forming materials, and color impurities.

The problem of removing impurities from crude oils and hydrocarbon fractions or hydrocarbons produced therefrom becomes more important each year. This is particularly true with respect to the separation of sulfur and sulfur containing compounds. As low sulfur crudes are being consumed at a rate exceeding discovery of new fields, it is becoming increasingly necessary for refiners to process materials containing larger quantities of sulfur. The detrimental effects of sulfur and sulfur compounds are well known to those skilled in the art. Hydrogen sulfide, for example, is recognized as being very corrosive particularly at the temperatures which are required when processing crude oils and the higher crude fractions, such as vacuum reduced crude, thermally topped crude, heavy gas oil, lube oils, etc. A failure to remove compounds which produce quantities of hydrogen sulfide, necessitates the use of costly alloys and chemical treating within process equipment and increases the hazards of fire due to equipment failure. In the processing of light hydrocarbon fractions particularly finished products, such as naphtha, distilled naphthalene, kerosene, etc., which need not be heated to high temperatures, the problem is present to a lesser degree; however, sulfur compounds are further undesirable in these fractions because of their effect on color and gum stability and because of their tendency to produce combustion deposits and bad odors. Gasolines present a still further problem in that certain sulfur compounds have a detrimental effect on the susceptibility or responsiveness of motor fuels to tetraethyl lead. Of equal or possibly even greater importance is the poisoning effect which sulfur compounds have on catalysts used in many hydrocarbon processes. For example, hydrogen sulfide inhibits catalytic activity of hydrogenation catalysts such as palladium and platinum. Sulfur compounds also have detrimental effects on iron catalysts, on the vanadium catalyst used in the oxidation of naphthalene to phthalic anhydride, or nickel catalysts used in reforming and many others.

It is the object of this invention to provide an improved method for the removal of impurities from hydrocarbon oils.

Another object of this invention is to provide a process for removing catalyst poisons from hydrocarbon oils.

Still another object of this invention is to treat hydrocarbon oils to reduce their corrosive characteristics, increase their lead susceptibility, color stability and gum stability.

A further object of this invention is to provide an improved process for removing sulfur and sulfur compounds from hydrocarbon oils.

These and other objects will become more apparent from the following detailed description and discussion.

In the method of this invention a hydrocarbon oil is treated with a purification agent in an amount less than that required for complete removal of impurities; the solids resulting from treatment are separated from the partially purified hydrocarbon oil; the partially purified hydrocarbon oil is treated with an excess of the purification agent, the major portion of the purified hydrocarbon oil is separated and the remaining hydrocarbon oil, solid impurities and excess purification agent are recycled to the first purification step.

This invention finds application in the treatment of many hydrocarbons and hydrocarbon mixtures. For example, it may be used to remove impurities, such as sulfur or sulfur compounds, from crude oils, vacuum reduced crude oils, lube oils, thermally topped crude oils, gas oils, distillates, kerosene, etc. It also finds application in the treatment of naphthas and gasolines including those produced by catalytic cracking, reforming, thermal cracking, etc., for the improvement of color stability, lead response and other properties previously discussed. Still another valuable use for this invention lies in the purification of feed materials for use in catalytic processes in which sulfur compounds act as catalyst poisons, for example in the preparation of purified naphthalene for use in the production of phthalic anhydride.

One of the problems involved in treating hydrocarbons is the removal of solid impurities which are present in the untreated material or which may be formed in the treating process. In many instances the problem is complicated by the fact that the chemicals used in treating are also solids and are intermixed with the impurities as a result of the treatment. Since the chemicals used for treating are frequently equal to or even greater in value per unit than the oils being treated, this presents the further problem of separating unused chemicals from solid impurities. If, as is often necessary, an excess of treating chemicals is used to assure the efficient and substantially complete removal of sulfur compounds, large amounts of chemicals may be lost in the solids impurities residue.

The method of this invention overcomes this difficulty by conducting the treating operation in two steps. In the first step, the untreated hydrocarbon oil is contacted with an amount of purification agent less than that required to react with all of the sulfur. The solids formed as a result of the reaction of the treating agent with the impurities are then separated from the partially purified hydrocarbon oil. Since all the treating agent is consumed due to the chemical excess of impurities, there is no remaining treating agent to be lost or carried out of the system with the solids. The partially purified hydrocarbon oil is then treated with an excess of the purification agent above that amount required to react with the remaining impurities. The solids formed in this second treating step along with a portion of the purified hydrocarbon oil and the excess treating agent are recycled to the first step. This method of operation not only prevents the loss of unused treating agent but also obviates the handling of unreacted treating agent in the disposal of the solid impurities. This is particularly desirable where the treating agent in the unreacted state presents special or hazardous disposal problems. Other advantages also result from this method of operation depending on the type of oils being treated and the treating agents used.

One major feature of this processing scheme is that the hydrocarbon effluent has been in contact with an excess of treating agent and thus has had all of the impurities removed.

As mentioned previously this invention finds application in the preparation of feed materials in processes where the catalyst is poisoned by the presence of sulfur compounds. A particularly good example of this is the preparation of purified naphthalene for use in the production of phthalic anhydride. The subsequent discussion will be directed sepecifically to this type of operation, however, this is not to be construed in any sense as limiting the scope of the invention.

In carrying out the treatment of crude naphthalene, the feed is contacted in a first reaction zone with between about 10 percent and about 90 percent, and preferably between about 40 percent and about 60 percent of the treating agent required to react with all of the sulfur and sulfur compounds contained therein. The weight of treating agent required per unit weight of naphthalene will, of course, depend on the sulfur content of the naphthalene. The usual crude naphthalene contains between about 0.2 percent and about 1.0 percent sulfur; however, it is not intended that this process be so limited and it will be applicable for any range of sulfur content. In the second step of the process the solid compounds formed in the reaction zone are separated from the partially purified naphthalene by filtration, distillation, centrifugation or other conventional separation means. The partially purified naphthalene is then contacted in a second reaction zone with an excess of the treating agent, usually between about 200 percent and about 400 percent of the amount required to react with the remaining sulfur and sulfur compounds. The mixture of purified naphthalene, solids impurities and excess treating agent is transferred from the second reaction zone to a separation zone wherein the major portion of the purified naphthalene is removed and the solids, excess treating agent and a small amount of purified naphthalene are recycled to the first reaction zone. More usually, the separation of purified naphthalene is effected by distillation; however, other conventional separation methods well known in the art may also be used. The purified naphthalene provided by operating in accordance with the method of this invention varies from as low as 0.01 percent sulfur up to whatever level of sulfur concentration may be desired.

The temperature in the two reaction zones is maintained above 176° F., the melting point of naphthalene, and preferably usually not over about 700° F. to 800° F. The more usual operating temperature is between about 250° F. and about 600° F. The treatment of naphthalene may be carried out at atmospheric pressure or higher pressures may be used. In any event, the pressure is maintained at a sufficient level to prevent the vaporization of naphthalene in the reaction zones.

The time required to complete the reactions in each zone will vary between about 1 minute and about 30 hours, depending upon the amount and type of the treating agent used and the treating temperature maintained in the reaction zones. More usually, the reaction time in each reaction zone is between about 5 minutes and about 60 minutes.

Crude naphthalene often contains organic impurities other than sulfur compounds which do not react with the treating agent or if they do so react, do not form solid compounds. The secondary separation step in this process is provided to remove purified naphthalene from these organic impurities. When this separation is effected by distillation, the temperature and pressure in the distillation zone are maintained at a sufficient level usually between about 425° F. and about 500° F. and between about atmospheric and about 15 p.s.i.g. to vaporize the naphthalene and at the same time retain these impurities in the liquid state In the normal course of the process these impurities are recycled through the system and in order to control their concentration it is necessary to withdraw from the system a portion of the recycle stream either continuously or intermittently. This stream may be treated further in a distillation or fractionation zone to remove additional naphthalene, or it may be discarded.

This invention also finds use in the treatment of hydrocarbon oils other than naphthalene. For example, in the treatment of hydrocarbon mixtures it finds particular application in the purification of gasolines or naphthas and fractions of similar boiling ranges for use as feed stocks in reforming, hydrogenation and other processes. It is within the scope of the invention to treat previously treated stocks to remove residual quantities of impurities as well as to treat so called "raw" or untreated fractions. Those mixtures more often treated will have boiling ranges between about 100° F. and about 500° F. As in the case of the naphthalene treatment, this process is applicable to the treatment of hydrocarbon oils containing either large or small amounts of sulfur. In the treatment of these oils, hereinafter called naphtha, between about 40 percent and about 60 percent of the treating agent required to react with all of the sulfur is contacted with the naphtha in the first reaction zone. The solid reactants produced in this zone are separated from the partially purified naphtha by a method similar to that previously described and a second reaction step is employed wherein the partially purified naphtha is contacted with between about 200 percent and about 400 percent of the treating agent required to react with the remaining sulfur. The purified naphtha, additional solids and excess treating agent are then further processed in a manner similar to that described for naphthalene. In the treatment of naphtha the reaction zone temperatures are usually maintained between about 250° F. and 600° F. The pressure is controlled to maintain the naphtha in said zones in a liquid state, usually between about atmospheric and about 500 p.s.i.g.

Substantially all of the sulfur may be removed from the naphtha by maintaining a sufficient reaction time in each reaction zone. This usually varies between about 5 minutes and about 60 minutes, depending on the operating conditions and the treating agent used. The more preferred reaction time in the first zone is usually between about 15 minutes and about 30 minutes.

In accordance with the present invention, a number of treating agents may be used. Of value are fuller's earth, infusorial earth, animal charcoal or any porous or finely divided material which normally contains small quantities of metal oxides such as lime and which material is also capable of absorbing or adsorbing coloring matters, resin substances or other materials of high molecular weight. Purification of hydrocarbon oils may also be accomplished by treatment with small quantities of metals such as the alkali metals or other easily melted metals or like properties. Another useful method of purifying hydrocarbon oils is to treat them with small amounts of metal compounds such as metal ammonia compounds, metal carbides or other metal compounds of acetylene.

Although any of the above treating agents may be used the second group, that is sodium, potassium, lithium, rubidium, cesium, or other easily melted metals of like properties either singly or in mixtures are particularly effective. These treating agents may be used either in bulk form or they may be dispersed in a suitable liquid medium, for example, in a hydrocarbon oil similar to that being treated. Also, if desired, they may be used in conjunction with inert solids, such as for example by dispersion on the surface of the solids. Treatment with a dispersion in oil is preferable because of the ease of handling and because of the large surface area of treating agent provided by this method. However, good results are also obtained by the use of these treating agents in the other forms stated.

Dispersions of sodium, potassium, etc. in oil may be prepared by any conventional means. A usual method of preparation comprises agitating a mixture of the metallic treating agent and a dispersing agent with a dispersator operated at high speeds at a temperature sufficient to melt the metal and thereby disperse globules of metal ranging from about 1 to about 100 microns in size. The dispersing medium may be any oil of a similar boiling range, more usually one having properties similar to the oil being treated. Preferably, the dispersing medium is the same type of oil as that being treated. The weight percent of treating agent in the dispersion may vary over wide ranges; however, the smaller the metal concentration, the more the dispersion which must be handled. Preferably, the weight percent metal is between about 30 percent and about 60 percent.

In order to more fully describe the invention and provide a better understanding thereof, reference is had to the accompanying drawing which is a diagrammatic illustration of a preferred embodiment of this invention.

Referring to the drawing, crude naphthalene containing about 0.86 percent sulfur, principally in the form of sulfur compounds, such as for example, benzothiophene, and other organic impurities is preheated in a conventional heater (not shown) to a temperature of about 400° F. and is admitted to a reactor 5 through conduit 1. At the same time a dispersion of about 50 percent sodium in naphthalene in an amount less than that required to remove all of the sulfur is admitted to the reactor through conduit 3. The alkali dispersion and the crude naphthalene are mixed and agitated in the reactor 5 at atmospheric pressure by means of a conventional mixing device such as a propeller mixer (not shown). To provide additional mixing and prevent the accumulation of the solid reaction products in the bottom of reactor 5, the mixture in the reactor is circulated by means of a pump 9 through conduit 7 from the lower to the upper portion of the reactor. A part of the circulated stream, which contains partially purified naphthalene with a sulfur content of about 0.4 percent and solid reaction products, is pumped through conduit 11 into a filter 13. The quantity of this stream is controlled to provide a holding time within the reactor 5 of about 30 minutes.

Solid reaction products are separated in filter 13 and are removed from the system through conduit 15. It may be desirable to provide a filter aid material to assist in obtaining good filtration. In this specific illustration Super Filtrol is added to the mixture in conduit 11 for this purpose. It is within the scope of this invention to separate the solids from the partially purified naphthalene after the first reaction step by conventional means other than the filtration step described. One such method readily adaptable to this process is separation by centrifugation. The filtrate from filter 13 passes through conduit 17 into a reactor 21. The temperature of the naphthalene through the filtration step and in the reactor 21 is maintained at about 400° F. by indirect heat exchange in a conventional heater or exchanger (not shown) located either before or after the filter 13.

An additional amount of sodium dispersion, of an amount greater than that required to remove the remaining sulfur, is admitted to the reactor 21 through conduit 19 for reaction with the partially purified naphthalene. In this reactor also the temperature is maintained at 400° F. at atmospheric pressure and turbulence and intimate contact between the naphthalene and the alkali are provided by a conventional mixer (not shown) and by recycling the reactor through conduit 24. The reactor 21 is of sufficient size to provide a holding time of about 15 minutes which is adequate to remove the remaining sulfur. The purified naphthalene, solid reaction products and excess sodium exit from reactor 21 through pump 23 and are passed through conduit 26 to still 27.

In still 27 the major portion of the purified naphthalene is flash vaporized at atmospheric pressure and at 425° F. and is removed overhead as product through conduit 25. The heat required to vaporize the naphthalene may be supplied by conventional indirect heat exchange to the stream passing through conduit 26 (not shown) or it may be obtained by other means, for example by reboiling the bottom of still 27. The bottoms from still 27 containing solid reaction products, excess sodium and the remaining purified naphthalene are withdrawn through conduit 34 and recycled through pump 29 and conduit 31 to reactor 5.

The solids from the first reaction step contain amounts of partially purified naphthalene. This may be discarded with the solids; however, it may be sufficient in quantity to warrant recovery, in which case the solids will be further processed. In this specific example the solids are passed through conduit 15 into a stripper 43 where they are contacted with steam, admitted to the bottom of the stripper through conduit 41. The naphthalene free solids are removed from the stripper 43 through conduit 51. The partially purified naphthalene and steam exit through conduit 45, pass through a dryer 47 or other conventional separation means where the steam is removed and the dried partially purified naphthalene is combined with the filtrate in conduit 17.

Crude naphthalene often contains high boiling organic impurities other than sulfur compounds which may or may not react with sodium but in any event do not form solids which are removed in the normal course of this process. Without an additional processing step these organic impurities are continuously recycled and eventually become sufficiently concentrated to contaminate the naphthalene product. To eliminate this possibility, a portion of the bottoms is removed from still 27 either continuously or intermittently and is passed through conduit 33 to a small still 37 where the organic impurities are concentrated and removed as bottoms through conduit 39. The overhead containing a concentration of such impurities, less than the maximum allowable concentration in still 27, is returned to the system through conduit 35.

Although the foregoing is a preferred embodiment of the invention it is not intended that the process be limited to this particular scheme. Alternative arrangements which would readily suggest themselves to those skilled in the art are also considered to be within the scope of this invention. For example, it may be desirable and in certain circumstances more economical to carry out the heating process as a batch operation rather than in the continuous manner as illustrated. Specifically a batch process might involve only two vessels, a reactor and a partially purified product accumulator. The steps of a batch process could follow the following sequence: (1) Fill the reactor with untreated oil; (2) add an excess of sodium; (3) reflux and agitate the mixture to provide a suitable reaction time; (4) take a part of the charge (now purified) overhead as yield; (5) add more untreated oil whereby there is present a deficiency of sodium; (6) reflux and agitate; (7) take the partially purified material overhead to the accumulator; (8) remove the residue solids from the reactor; (9) return the material in the accumulator to the reactor; (10) add an excess of sodium thus returning the operation to part (2) of the cycle.

The process used in the treatment of gasoline and naphthas is similar to the process specifically described in the treatment of naphthalene, the major difference being in the operating conditions and the relative quantities of the various process streams.

The method of this invention has many advantages to recommend it. As previously mentioned, the consumption of treating agent is reduced to a minimum and this method makes it unnecessary to dispose of quantities of the treating agent in the unreacted state. This is particularly important when alkali treating agents, which are violently reactive with oxygen are used. Other important advantages resulting from this method are: (1) The still bottom product can be conveniently handled as a liquid containing a large percentage of hydrocarbon oil without loss of the hydrocarbon oil and (2) the major portion of the solid reaction products need not be handled in the still thereby reducing process equipment cleanout time to a minimum, and (3) the hydrocarbon oil has been in contact with an excess of treating agent thereby assuring complete removal of reactable contaminants.

To further illustrate the invention the following specific example is presented. These data were obtained in glassware apparatus with the oil being treated in a one-liter baffled flask, fitted with a thermometer, reflux condenser and mechanical stirrer. Heat was supplied by means of an oil bath and sodium in the form of 5 to 20 micron particles in a continuous phase liquid dispersion was added as rapidly as possible to the flask. Stirring was continued in each phase of the process until the reaction was completed.

*Example*

This run was a three-step treatment of crude naphthalene containing about 0.86 percent sulfur to simulate a continuous process. The sodium used was a 50 weight percent sodium in toluene dispersion. The naphthalene was first treated with an amount of sodium less than that required to remove all of the sulfur. The reaction mixture was filtered and treated with an excess of sodium and then distilled to approximately 60 percent overhead. The next charge of crude naphthalene was added to the bottom product from the distillation and the process was repeated. In the third step, another charge of crude naphthalene was added to the bottom product from the second distillation and the process of step 2 was repeated.

The reaction temperature and pressure were maintained at 400° F. and 0 p.s.i.g. during each part of this run. The time required for the first reaction, that is, the reaction conducted in the presence of a deficiency of sodium was about one hour and the time required to complete the second reaction, that is, the reaction in the presence of an excess of sodium was about 20 minutes. The data from this run is as follows:

*Part I*:
Charge:
500 gm. crude naphthalene
11.2 gm. sodium dispersion in toluene
Filtrate 420.7 gm. 20 gm. used as analytical sample (0.32% S)
Filter cake 65.2 gm. (Free sodium content nil.)
To 400 gm. filtrate added 27.3 gm. dispersion
Distilled: Fraction=261.8 gm. (0.05% S)

*Part II*:
Added 502 gm. crude naphthalene to bottom product in distillation pot
Added 32 gm. Super Filtrol after reaction period and before filtration
Filtrate 534.6 gm. 20 gm. used as analytical sample (0.27% S)
Filter cake 88 gm. (Free sodium content nil.)
To 512 gm. filtrate added 28 gm. dispersion
Distilled: Fraction=426.4 gm. (0.05% S)

*Part III*:
Added 500 gm. crude naphthalene to bottom product in distillation pot
Added 24 gm. Super Filtrol before filtration
Filtrate 524.1 gm.
Filter cake 70 gm. (Free sodium content almost nil.)
To 523 gm. filtrate added 33.3 gm. dispersion
Distilled: Fraction=418.8 gm. (0.01% S)
Residue in distillation pot=125.6 gm.

It is apparent from the data presented that the sulfur content of the naphthalene is considerably reduced by this method of treatment. Approximately 65 percent of the sulfur is removed in the first cycle of this three-step process and over 80 percent of the remaining sulfur is removed in the second cycle. The overall yield of ample 96.8 percent is recovered based on the naphthalene purified naphthalene is very high, in this particular ex- in the charge and correcting for handling and sampling losses. This includes naphthalene recovered from the filter cake by steam distillation amounting to approximately 6 percent of the total naphthalene recovery. It is further apparent from the free sodium content in the filter cake from each operation that the method of this invention is successful in preventing the loss of unused treating agent, and without the use of a costly and hazardous recovery treatment.

The following data is presented to illustrate a typical commercial operation involving the treatment of a heavy cracked gasoline.

*Example*

Flows:
Fresh gasoline feed (0.33 wt. percent sulfur) _____lb./hr__ 50,000
Treating agent to reactor 5 _____lb./hr__ 0
Filter cake (0 wt. percent free sodium)
    lb./hr__ 425
    Gasoline content _____lb./hr__ 25
Gasoline feed to reactor 21 _____lb./hr__ 62,240
Treating agent to reactor 21 _____lb./hr__ 470
Gasoline product _____lb./hr__ 49,870
Feed to secondary recovery still 37 _lb./hr__ 400
    Bottoms _____lb./hr__ 200
Recycle to reactor 5 _____lb./hr__ 12,640

Temperatures:
Reactor 5 _____° F____ 600
Filter _____° F____ 600
Stripper _____° F____ 250
Reactor 21 _____° F____ 600
Primary recovery still 27—
    Top _____° F____ 450
    Bottom _____° F____ 475
Secondary recovery still 37—
    Top _____° F____ 475
    Bottom _____° F____ 500

Pressures:
Reactor 5 _____p.s.i.g____ 600
Filter _____p.s.i.g____ 600
Stripper _____p.s.i.g____ 15
Reactor 21 _____p.s.i.g____ 600
Primary recovery still 21 _____p.s.i.g____ 15
Secondary recovery still 37 _____p.s.i.g____ 5

Miscellaneous:
Average holding time in reactor 5__minutes__ 30
Average holding time in reactor 21__do____ 10
Sulfur content of gasoline feed to reactor 21 _____percent by weight__ 0.16
Sulfur content of gasoline product __do_____ 0.005
Treating agent 50% by weight dispersion of sodium in gasoline.
ASTM distillation:
Gasoline Feed—
    Initial _____° F__ 250
    50% _____° F__ 310
    E.P. _____° F__ 425
44° API gravity.

Having thus provided a description of the invention along with specific examples thereof, it should be understood that no undue limitations or restrictions are to be imposed by reason thereof, but that the scope of the invention is defined by the appended claims.

We claim:

1. A liquid phase naphthalene treating process which comprises contacting a naphthalene, containing sulfur compounds and organic compounds as impurities, some of which do not react in the presence of an alkali metal to form solid materials, in a first reaction zone at a temperature between about 250° F. and about 600° F. with an alkali treating agent selected from the group consisting of lithium, sodium, potassium, rubidium, cesium and mixtures thereof in an amount less than that required to react with all of the solid forming impurities, maintaining the naphthalene and said treating agent in said first reaction zone for a period of time between about 5 minutes and about 60 minutes, thereby consuming all of the treating agent, separating the solid reaction products from the partially purified naphthalene, contacting the reaction solids in a stripping zone with a gasiform stripping agent to remove additional naphthalene, separating the gasiform stripping agent from the additional naphthalene and combining this naphthalene with the partially purified naphthalene from the first reaction zone, further treating the combined partially purified naphthalene in a second reaction zone under similar conditions with an amount of said treating agent in excess of that required to react with the remaining solid forming impurities, maintaining the naphthalene and the treating agent in said second reaction zone for a period of time between about 5 minutes and about 60 minutes thereby reacting the remaining solid forming impurities, separating the major portion of the purified naphthalene, transferring a portion of the remaining mixture of naphthalene, reaction solids, liquid organic impurities and excess treating agent to a flash vaporization zone wherein liquid organic impurities are concentrated and a stream containing a lower percentage of liquid organic impurities is removed from said flash zone and is recombined with the unvaporized portion of the aforementioned reaction mixture remaining in the second reaction zone and recycling the combined mixture containing excess treating agent, purified naphthalene, liquid organic impurities and reaction solids to the first reaction zone.

2. The process for treating a hydrocarbon oil containing as impurities sulfur compounds and organic compounds, some of said impurities being vaporizable liquid organic impurities which do not react in the presence of an alkali metal to form solid materials and the remainder of said impurities being impurities which do react in the presence of an alkali metal to form solid reaction products, which comprises in a first reaction zone contacting said hydrocarbon oil with an alkali metal treating agent in an amount less than that required to react with all of the solid-forming impurities, withdrawing partially purified hydrocarbon oil and solid reaction products from said first reaction zone, separating said solid reaction products from said partially purified hydrocarbon oil, contacting said solid reaction products in a stripping zone with stripping gas to remove additional partially purified hydrocarbon oil therefrom, separating said stripping gas from said additional partially purified hydrocarbon oil, combining said additional partially purified hydrocarbon oil with the partially purified hydrocarbon oil from the first reaction zone, further treating the combined partially purified hydrocarbon oil in a second reaction zone with an amount of said treating agent in excess of that required to react with the remaining solid-forming impurities to form in said second reaction zone a product comprising purified hydrocarbon oil, solid reaction products, liquid organic impurities and excess treating agent, separating and withdrawing a major portion of said purified hydrocarbon oil from said second reaction zone, transferring a portion of the remaining reaction product of the second reaction zone to a flash vaporization zone wherein liquid organic impurities are concentrated separately withdrawing from said vaporization zone liquid organic impurities and a stream containing a lower percentage of liquid organic impurities, recombining said stream with the unvaporizable portion of the aforementioned reaction product remaining in the second reaction zone and recycling the same to the first reaction zone.

3. The process according to claim 2 in which the hydrocarbon oil is naphthalene.

4. The process for treating a hydrocarbon oil containing as impurities sulfur compounds and organic compounds, some of said impurities being vaporizable liquid organic impurities which do not react in the presence of an alkali metal to form solid materials and the remainder of said impurities being impurities which do react in the presence of an alkali metal to form solid reaction products, which comprises in a first reaction zone contacting said hydrocarbon oil at a temperature between about 250° F. and about 600° F. with an alkali metal treating agent in an amount less than that required to react with all of the solid-forming impurities, withdrawing partially purified hydrocarbon oil and solid reaction products from said first reaction zone, separating said solid reaction products from said partially purified hydrocarbon oil contacting said solid reaction products in a stripping zone with stripping gas to remove additional partially purified hydrocarbon oil therefrom, separating said stripping gas from said additional partially purified hydrocarbon oil, combining said additional partially purified hydrocarbon oil with the partially purified hydrocarbon oil from the first reaction zone, further treating the combined partially purified hydrocarbon oil in a second reaction zone at a temperature between about 250° F. and about 600° F. with an amount of said treating agent in excess of that required to react with the remaining solid-forming impurities to form in said second reaction zone a product comprising purified hydrocarbon oil, solid reaction products, liquid organic impurities and excess treating agent, separating and withdrawing a major portion of said purified hydrocarbon oil from said second reaction zone, transferring a portion of the remaining reaction product of the second reaction zone to a flash vaporization zone wherein liquid organic impurities are concentrated separately withdrawing from said vaporization zone liquid organic impurities and a stream containing a lower percentage of liquid organic impurities, recombining said stream with the unvaporizable portion of the aforementioned reaction product remaining in the second reaction zone and recycling the same to the first reaction zone.

References Cited in the file of this patent

UNITED STATES PATENTS

| | | |
|---|---|---|
| 1,962,698 | Vose | June 12, 1934 |
| 2,626,236 | Tatterson | Jan. 20, 1953 |
| 2,778,863 | Maisel et al. | Jan. 22, 1957 |